United States Patent [19]
Willner et al.

[11] Patent Number: 5,445,005
[45] Date of Patent: Aug. 29, 1995

[54] PROCESS FOR CALIBRATING A CALORIMETRIC FLOW INDICATOR

[75] Inventors: Jürgen Willner, Schwalbach, Germany; Kurt Steilen, Frankfurt am Main, Germany

[73] Assignee: Klaus Kobold, Belleair Shore, Fla.

[21] Appl. No.: 126,647

[22] Filed: Sep. 27, 1993

[30] Foreign Application Priority Data

Oct. 2, 1992 [DE] Germany .................. 42 33 290.7
Oct. 29, 1992 [DE] Germany .................. 42 36 559.7

[51] Int. Cl.⁶ .................................................. G01F 25/00
[52] U.S. Cl. ............................................. 73/3; 374/1
[58] Field of Search .................. 073/3, 204.11, 204.25, 073/204.15, 861.02, 861.01, 861.03; 374/31, 39, 40, 1,

[56] References Cited

U.S. PATENT DOCUMENTS

| | | | |
|---|---|---|---|
| 3,638,489 | 2/1972 | Buran et al. | 073/003 |
| 4,685,324 | 8/1987 | Bourdon et al. | 073/003 |
| 5,156,459 | 10/1992 | Baker et al. | 324/95 |
| 5,237,523 | 8/1993 | Bonne et al. | 374/040 |
| 5,311,762 | 5/1994 | Drexel | 073/003 |

FOREIGN PATENT DOCUMENTS

| | | |
|---|---|---|
| 0274573 | 7/1988 | European Pat. Off. |
| 0330915 | 9/1989 | European Pat. Off. |
| 3429729 | 7/1986 | Germany |

OTHER PUBLICATIONS

Experiments in Fluids, Bd. 8, Nr. 5, 1 Feb. 1990, Berlin, pp. 257–262, XP113890, "Computer-aided calibration and measurements with a quadruple hotwire probe", p. 257, col. 1, line 32–p. 259, col. 1, line 10; Figure 2.

Primary Examiner—Hezron E. Williams
Assistant Examiner—Nashmiya Ashraf
Attorney, Agent, or Firm—Wenderoth, Lind, & Ponack

[57] ABSTRACT

The invention relates to a process for calibrating a calorimetric flow indicator to a medium to be measured. The flow indicator has a sensor element that provides a temperature-dependent resistance and which heat up in a short period of time by means of electrical current heat. The resistance variation of the sensor element represents a measure of the flow velocity of a medium flowing by the sensor element. The calorimetric flow indicator is set for a specified medium other than the medium to be measured, with a resistance value Ro at a zero flow and a resistance value $R_{max}$ at a maximum flow, defining a preset range of measurement $R_{max}$—Ro for the specified medium. To calibrate for the medium to be measured, a resistance value Rx of the sensor element at a zero flow of the medium to be measured is measured, the resistance value Ry of the sensor element at a maximum operating flow of the medium to be measured is measured, and a measuring range Ry—Rx, defined by the resistance values Rx and Ry, is automatically brought into coincidence with the preset measuring range $R_{max}$—Ro by displacing and extending the measuring range in relation to the preset range.

17 Claims, 1 Drawing Sheet

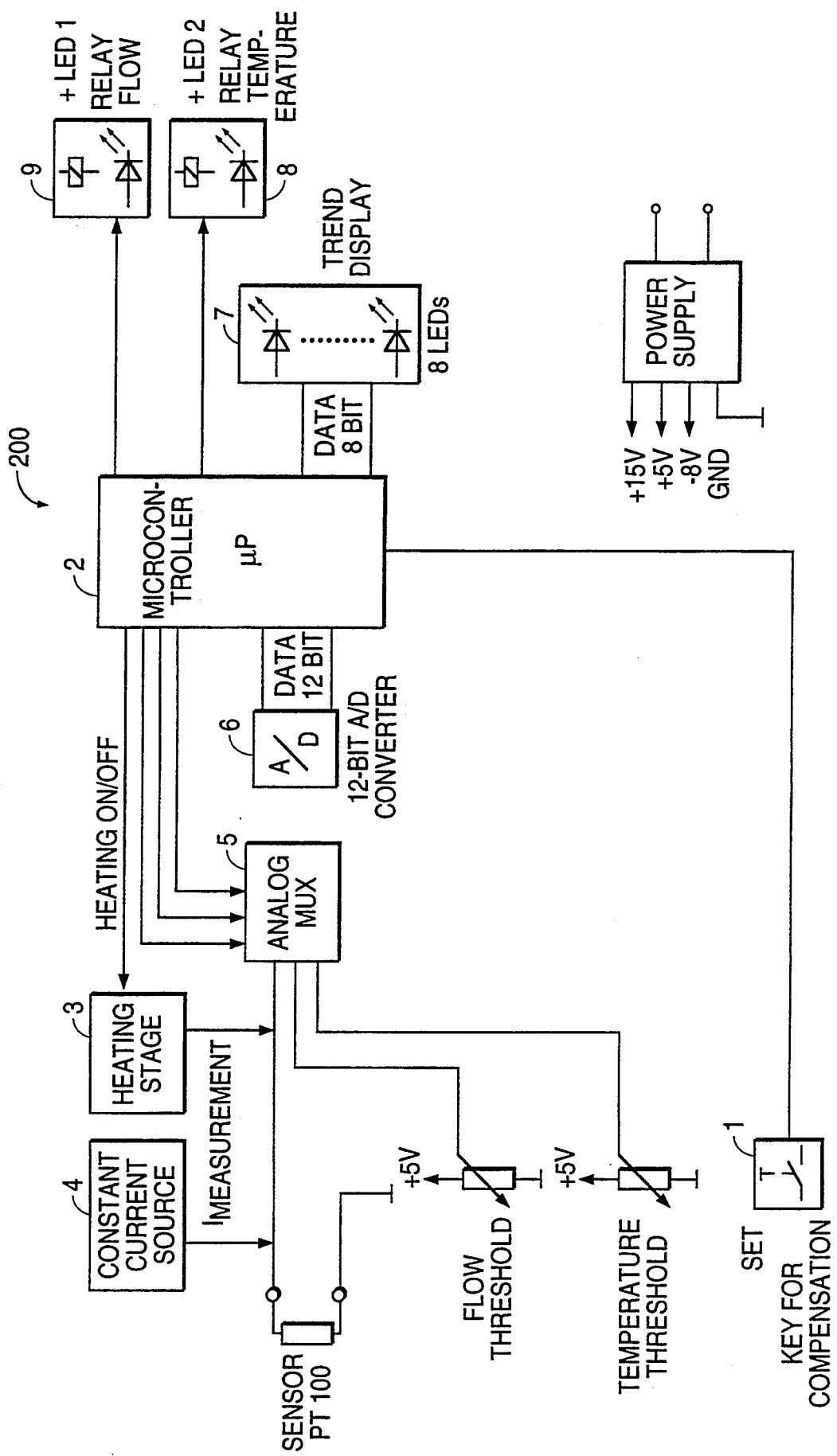

PROCESS FOR CALIBRATING A CALORIMETRIC FLOW INDICATOR

BACKGROUND OF THE INVENTION

The invention relates to a process for calibrating a calorimetric flow indicator to a medium to be measured. The flow indicator comprises a sensor element having a temperature-dependent resistance and which heats up in a short period of time by means of electrical current heat and whose resistance variation (induced by cooling), which represents a measure for the flow velocity of a medium flowing by the sensor element, is measured. In the process, for a specified medium, the resistance value Ro at flow 0 and the resistance value $R_{max}$ at maximum flow define a preset range of measurement $R_{max}$—Ro.

Media whose flow velocities are to be measured with a calorimetric flow indicator have varying heat capacities or varying thermal conductivities. Therefore, commercial calorimetric flow indicators have, for a specified medium, e.g. water or oil, a characteristic curve. An electric circuit is designed in such a manner that in the best case at flow 0, the lowest value on a measuring scale of a calorimetric flow indicator is assumed, and at maximum flow, the highest value on the measuring scale is assumed, and thus the range of measurement on the measuring scale is assumed. Thus all possible flow velocities are indicated within the measuring scale. A switching point, for example for indicating a flow or temperature threshold value of the measured medium in order to give a signal indicating that the threshold value has been exceeded, can be set within the range of measurement. Owing to these circumstances, a calorimetric flow indicator can be used optimally only for that medium for which is has been designed by the manufacturer. Yet the manufacturer often does not know for which medium the customer wants to use the flow indicator. If the device is adjusted and set by the manufacturer to, e.g. water, the customer, while measuring a different medium, may have an indication of a zero measured value even though there is already a flow.

It has therefore been proposed to provide such calorimetric flow indicators with means that allow a specific adaptation to the medium to be measured by adjusting the switching point that indicates a flow threshold value. However, this has the drawback that frequently the full measuring scale of the calorimetric flow indicator is not used up to the maximum flow velocity for different media to be measured, and thus, for example, only a portion of the indicator lights may light up at the maximum flow velocity in an LED display. At the same time, a portion of the measurement is "given away" or lost when the accuracy of the indicator is correspondingly reduced. Thus, it can happen that the switching point, at which a signal is supposed to be given that a threshold value of the flow velocity has been exceeded, is not within that portion of the measuring scale that is even scanned for the specific medium up to the maximum flow velocity.

In another known device a second potentiometer is provided that is rotated by hand until, at maximum flow velocity, the entire range of indication has been exploited, and thus, for example, in the case of an LED display, all indicating lamps light up. It assumes, however, not only that the start value, but also the final value, has been specified by hand. This is tedious manipulation that is to be avoided with the present invention.

SUMMARY OF THE INVENTION

The object of the invention is, therefore, to propose a process for calibrating a calorimetric flow indicator that delivers an optimal indication of the measured value for different media and also allows an arbitrary definition of a switching point (threshold value) within the measuring scale.

The problems with the processes of the aforementioned kind are solved, in essence, by:

—measuring a resistance value Rx of a sensor element of a calorimetric flow indicator at flow 0 of a medium that is to be measured that deviates from a specified medium by means of an electric circuit and —measuring a resistance value Ry of the sensor element at maximum operating flow of the medium that is to be measured, and —automatically bringing the measuring range Ry—Rx, defined by the measured resistance values Rx and Ry into coincidence with a measuring range $R_{max}$—RO preset by the manufacturer for the specified medium by means of displacement and extension.

Thus, even though the calorimetric flow indicator is designed by the manufacturer for only one specific medium, such as water or oil, for which it functions utilizing its entire measuring scale, it is in this manner achieved that it can also be used for other media in the same optimal manner without requiring any special manipulations and adjustments by means of a potentiometer.

This process can be preferably implemented by an electric circuit that has a program-controlled microcontroller to store and process data representing the resistance values Ro, $R_{max}$, $R_x$ and Ry. With such a circuit, the process according to the invention can be implemented quickly and reliably.

The resistance values Rx and Ry are preferably measured as voltage values by sending a constant measuring current through the sensor element at the respective flow velocities.

To obtain a signal which indicates that a predefined flow velocity and/or temperature has been exceeded or fallen below, a circuit can be used that emits such a signal when a switching point corresponding to a threshold value set within a range of measurement has been exceeded.

For this purpose, the value of the flow velocity or the temperature of the medium is periodically polled, preferably by means of the program-controlled microcontroller. The measurement result is processed into a trend display (in order to deliver to the user corresponding intermediate information) and compared with the preset threshold values or the preset threshold value, and a signal is emitted when the threshold value is exceeded. Thus, when monitoring a coolant cycle, e.g., it can be determined when circulation of the coolant falls below a necessary flow velocity or a critical temperature of the coolant is exceeded, and a corresponding alarm can be given.

Another more reliable indication of the measured value and monitoring of flow is obtained when a circuit with temperature compensation for the measured medium is used.

BRIEF DESCRIPTION OF THE DRAWING

The accompanying FIGURE is a block diagram of an electric circuit used in the process according to the present invention.

DETAILED DESCRIPTION OF THE PREFERRED EMBODIMENT

To implement the invention a user proceeds, for example, as follows, reference being made to the accompanying block diagram.

First, the user fills a line in which flow is to be monitored with the medium concerned. A calorimetric flow indicator is provided in the wall of the line. At flow 0, a so-called set key 1 is depressed, the set key 1 being connected to a microcontroller 2 of a circuit 200. The microcontroller 2 is connected to a sensor element in such a manner that a resistance value Rx that is characteristic for flow 0 is automatically determined and is stored in the microcontroller. The user then produces a full operating flow and again depresses the set key 1, with the effect that now a resistance value Ry that characterizes the maximum operating flow is acquired in the microcontroller 2 and stored. The difference Ry—Rx defines the range of measurement, whose position and span is acquired by the microcontroller 2. Depending on the medium, this range of measurement can correspond, for example, to a flow velocity range of 0 to 0.5 m/s, 0 to 1.35 m/s, 0 to 2 m/s or 0 to 4 m/s. With the aid of the microcontroller 2, the range of measurement Ry—Rx is now displaced and/or expanded so that the calorimetric flow indicator exhibits virtually the same characteristics as with the medium originally preset by the manufacturer for the calorimetric flow indicator, with the result that now the indication of the measured value at flow 0 of the medium chosen by the user is at the beginning of the measuring scale and the indication of the measured value at a maximum flow of the medium chosen by the user is at the end of the measuring scale also, so that the entire measuring scale is utilized over the entire range of measurement. A switching point for signaling a danger state can now be arbitrarily set over the entire measuring scale.

A resistance value is measured according to the block diagram by switching on a heating stage 3 for a brief period of time, switching on a constant current source 4 during a cooling phase to determine the resistance value or by changing the resistance value of the sensor element (sensor Pt 100), which is assigned to the medium chosen by the user to be measured, and by evaluating the corresponding measured values.

With the aid of a program stored in the microcontroller 2 the values for the flow velocity and/or temperature are periodically polled by way or an analog MUX (multiplexer) 5. The data obtained are converted from analog to digital by 12 Bit A/D-converter 6. The digital data are then fed to the microcontroller 2 and processed by the microcontroller 2. To this end, the microcontroller 2 is intended for and suitable for delivering a trend display 7 of drops in flow velocity and/or increases in temperature, and triggering one or both of the relays 8 and 9 (connected with LED 1 and LED 2, respectively) when a threshold value for the flow velocity and/or temperature is exceeded. With the aid of the relays, a system, for example in which a coolant cycle is monitored, can be turned off in order to avoid extensive damage to the system.

We claim:

1. A process for calibrating a calorimetric flow indicator for a medium to be measured, wherein the calorimetric flow indicator comprises a sensor element that is located by a flow of the medium to be measured, that produces a temperature-dependent resistance, that is heatable by electrical current, and that produces measurable resistance variations which represent a measure of the flow velocity of the medium to be measured flowing by the sensor element, and wherein the calorimetric flow indicator has a resistance value R0 for a zero flow of a specified medium other than the medium to be measured and a resistance value Rmax at a maximum flow of the specified medium, thus defining a preset range of measurement Rmax—R0 for the calorimetric flow indicator, said process comprising the steps of:

measuring a resistance value Rx of the sensor element at a zero flow of the medium to be measured;

measuring a resistance value Ry of the sensor element at a maximum operating flow of the medium to be measured; and automatically coinciding a measuring range Ry—Rx for the medium to be measured, defined by the resistance values Rx and Ry, with the preset measuring range Rmax—R0 by displacing and extending the measuring range Ry—Rx in relation to the preset measuring range Rmax—R0.

2. The process of claim 1, wherein:

an electric circuit is provided that includes the sensor element and a program-controlled microcontroller for storing and processing data representing the resistance values R0, Rmax, Rx, and Ry;

said steps of measuring comprise storing the data representing the resistance values Rx and Ry in the microcontroller; and said step of automatically coinciding comprises displacing and extending the measuring range Ry—Rx in relation to the preset measuring range Rmax—R0 with the microcontroller.

3. The process of claim 2, wherein the electric circuit further comprises a signalling device connected with the microcontroller for emitting a signal when a switching point set within the measuring range Ry—Rx is exceeded.

4. The process of claim 3, wherein the switching point represents a threshold value of one of the flow velocity and the temperature of the medium.

5. The process of claim 3, wherein the electric circuit further comprises a trend display connected with the microcontroller such that periodic polling of the value of one of the flow velocity and the temperature of the medium to measured by the microcontroller can have the measurement results provided on the trend display and compared with a preset threshold value for the emission of a signal when the threshold value is exceeded.

6. The process of claim 2, wherein said step of measuring a resistance value Rx further comprises depressing a set key connected to the microcontroller when the flow of the medium to be measured is at zero flow and said step of measuring a resistance value Ry further comprises depressing the set key when the flow of the medium to be measured is at the maximum operating flow.

7. The process of claim 1, wherein the sensor element is provided in an electrical circuit providing temperature compensation for the medium to be measured.

8. The process of claim 1, wherein said steps of measuring the resistance values Rx and Ry each comprises sending a constant measuring current through the sensor element.

9. A process for calibrating a calorimetric flow indicator, comprising the steps of:
providing a calorimetric flow indicator comprising a sensor element that is located by a flow of a medium to be measured, that produces a temperature-dependent resistance, that is heatable by electrical current, and that produces measurable resistance variations which represent a measure of the flow velocity of the medium to be measured flowing by the sensor element, the calorimetric flow indicator having a resistance value R0 for a zero flow of a specified medium other than the medium to be measured and a resistance value Rmax at a maximum flow of the specified medium, thus defining a preset range of measurement Rmax-R0 for the calorimetric flow indicator;
measuring a resistance value Rx of the sensor element at a zero flow of the medium to be measured;
measuring a resistance value Ry of the sensor element at a maximum operating flow of the medium to be measured; and
automatically coinciding a measuring range Ry—Rx for the medium to be measured, defined by the resistance values Rx and Ry, with the preset measuring range Rmax—R0.

10. The process of claim 9, wherein said step of automatically coinciding comprises displacing and extending the measuring range Ry—Rx in relation to the preset measuring range Rmax—R0.

11. The process of claim 10, wherein:
said step of providing comprises providing an electric circuit that includes the sensor element and a program-controlled microcontroller for storing and processing data representing the resistance values R0, Rmax, Rx, and Ry;
said steps of measuring comprise storing the data representing the resistance values Rx and Ry in the microcontroller; and
said step of automatically coinciding comprises displacing and extending the measuring range Ry—Rx in relation to the preset measuring range Rmax—R0 with the microcontroller.

12. The process of claim 11, wherein said step of providing further comprises providing the electric circuit with a signalling device connected with the microcontroller for emitting a signal when a switching point set within the measuring range Ry Rx is exceeded.

13. The process of claim 12, wherein the switching point represents a threshold value of one of the flow velocity and the temperature of the medium to be measured.

14. The process of claim 13, wherein said step of providing further comprises providing the electric circuit with a trend display connected with the microcontroller such that periodic polling of measurement results of the value of one of the flow velocity and the temperature of the medium to measured by the microcontroller can have the measurement results provided on the trend display and compared with a preset threshold value for the emission of a signal when the threshold value is exceeded.

15. The process of claim 12, wherein said step of providing further comprises providing the sensor element in an electrical circuit providing temperature compensation for the medium to be measured.

16. The process of claim 11, wherein:
said step of providing further comprises providing a set key connected with the microcontroller;
said step of measuring a resistance value Rx further comprises depressing the set key when the flow of the medium to be measured is at zero flow; and
said step of measuring a resistance value Ry further comprises depressing the set key when the flow of the medium to be measured is at the maximum operating flow.

17. The process of claim 9, wherein said steps of measuring the resistance values Rx and Ry each comprises sending a constant measuring current through the sensor element.

* * * * *